(12) United States Patent
Williams

(10) Patent No.: US 7,536,977 B1
(45) Date of Patent: May 26, 2009

(54) ANIMAL EXERCISING APPARATUS

(76) Inventor: Earl M. Williams, 308 NW. 53rd Ter., Gainesville, FL (US) 32607

( * ) Notice: Subject to any disclaimer, the term of this patent is extended or adjusted under 35 U.S.C. 154(b) by 147 days.

(21) Appl. No.: 11/535,332

(22) Filed: Sep. 26, 2006

(51) Int. Cl.
*A01K 15/02* (2006.01)
(52) U.S. Cl. ..................................................... 119/700
(58) Field of Classification Search ................ 119/700, 119/843, 702, 703, 704
See application file for complete search history.

(56) References Cited

U.S. PATENT DOCUMENTS

| | | | | |
|---|---|---|---|---|
| 736,360 | A * | 8/1903 | Burgess ....................... | 119/700 |
| 2,155,684 | A | 4/1939 | Richards | |
| 3,709,197 | A * | 1/1973 | Moseley ...................... | 119/700 |
| 4,095,561 | A * | 6/1978 | Ruetenik ..................... | 119/700 |
| 4,205,628 | A | 6/1980 | Null | |
| 4,227,487 | A | 10/1980 | Davis | |
| 4,332,217 | A * | 6/1982 | Davis .......................... | 119/700 |
| 4,819,583 | A * | 4/1989 | Guerra ........................ | 119/700 |
| 4,918,766 | A * | 4/1990 | Leonaggeo, Jr. ............... | 4/495 |
| 4,938,469 | A * | 7/1990 | Crandell ....................... | 482/54 |
| 5,100,127 | A * | 3/1992 | Melnick et al. ............. | 119/700 |
| 5,114,390 | A | 5/1992 | Tribelhorn, Jr. | |
| 5,125,361 | A * | 6/1992 | Rowlands ................... | 119/700 |
| 5,277,150 | A | 1/1994 | Rhodes | |
| D347,912 | S | 6/1994 | Golden et al. | |
| 5,607,376 | A * | 3/1997 | Magid ......................... | 482/54 |
| 6,347,603 | B1 * | 2/2002 | Felger ......................... | 119/700 |
| 6,722,316 | B1 | 4/2004 | Joycey et al. | |
| 6,837,186 | B1 | 1/2005 | Terao | |

* cited by examiner

Primary Examiner—Yvonne R. Abbott

(57) ABSTRACT

An Animal Exercising Apparatus comprising a treadmill and a detachable cage providing a dog or other animal with indoor exercise. The treadmill provides a parallelepiped platform having a hollow interior base, a raised dish platform having a dish, and a conveyor pulley system located within the interior base. The conveyor pulley system provides a continuous conveyor belt disposed over, around and in direct contact with first rollers and a second roller rotatably attached to opposite ends of the interior base, and a motor assembly for rotating the first rollers, thereby causing the conveyor belt to rotate around the first and second rollers. The detachable cage having a door with a latch prevents escape from or invasion by another animal into the treadmill and provides for easy cleaning. The dish allows an animal to drink or eat while exercising.

4 Claims, 3 Drawing Sheets

ANIMAL EXERCISING APPARATUS

BACKGROUND OF THE INVENTION

There have been many attempts to provide a suitable exercising device for dogs and other animals having a treadmill upon which the dog or other animal walks or runs. For example, U.S. Pat. No. 4,227,487 issued to Davis on Oct. 14, 1980 teaches an exercising apparatus for horses having a flat support structure formed of ultra high molecular weight polyethelyne plastic material attached to a frame between a first and second roller for supporting an endless belt, which is disposed over the plastic material and is in direct contact therewith and around the first and second roller. A power assembly rotates the first roller, thereby causing the endless belt to move around the first and second rollers and over the piece of plastic material. Longitudinal groves are disposed in the piece of plastic material and metal rods are disposed in the grooves and are operatively attached to said frame for grounding static electricity caused by movement of the endless belt over the piece of plastic material to the frame.

U.S. Pat. No. 4,205,628 issued to Null on Jun. 3, 1980 teaches a caged animal exerciser having an inclined surface that keeps a horse walking up hill, said exerciser having a variable speed control and automatic timer.

U.S. Pat. No. 5,277,150 issued to Rhodes on Jan. 11, 1994 discloses an unmotorized and unmechanically driven treadmill for exercising dogs. A support frame serves to movably support such treadmill and a treadway mounted thereon wherein a plurality of independent, spaced apart roller assemblies support and allow the continuous linear movement of the closed configuration treadmill. A bait animal is maintained in a bait cage out of the reach of the dog being exercised. The dog is restrained on the treadpath of the treadmill by a overhanging cable to which the dog is secured by a leash or lead.

U.S. Pat. No. 6,722,316 issued to Joycey et al. on Apr. 20, 2004 teaches a device for mounting to a conventional treadmill to allow the exercising of a dog.

U.S. Pat. No. 6,837,186 issued to Terao on Jan. 4, 2005 provides a treadmill for animals having a transparent enclosure and having a control console to allow a user to set parameters for the animal's exercise session. An overhead adjustable bar is included for attaching a leash to a dog.

U.S. Pat. No. 5,114,390 issued to Tribelhorn, Jr. on May 19, 1992 teaches a treadmill for sheep which has an attached trough.

U.S. Pat. No. 2,155,684 teaches a treadmill for a dog in which the dog is harnessed to sides of such treadmill. No cage is provided.

U.S. Pat. No. Des. 347,912 illustrates a design for a dog treadmill.

However, the prior art does not teach an Animal Exercising Apparatus which provides a treadmill having a detachable cage, a chain drive and an electric motor, a starting pedal and electronic timer, which is also equipped with a water dish. Such an apparatus is needed to fulfill the need for providing a dog or other animal with sufficient exercise without having to leave the dog's home, as well as providing a convenient means for placing a dog or other animal into a cage to prevent escape from such animal exercising apparatus and for cleaning such treadmill by being able to remove such cage from the treadmill. A cage which prevents other dogs or animals from attacking a dog or other animal inside the cage is also needed. An animal exercising apparatus is needed which provides the foregoing features, as well as a dish from which an animal may take a drink while exercising. Such an apparatus is needed which is practical, durable and easily used.

One object of the present Animal Exercising Apparatus is to provide a practical device for exercising a dog or other animal.

Another object of the present Animal Exercising Apparatus is to provide a durable, yet lightweight device for exercising a dog or other animal.

Even another object of the present Animal Exercising Apparatus is to provide a device for exercising a dog or other animal indoors.

Even yet another object is to provide an animal exercising apparatus having a cage which protects such dog or other animal from attack by another dog or other animal if another dog or animal is located either indoors with the exercising dog or other animal or outdoors in the event such apparatus is being used outdoors.

Yet another object of the present apparatus is to provide a removable cage for easy placement of a dog inside the cage and for ease of cleaning such treadmill.

Still another object is to provide an Animal Exercising Apparatus which addresses the problems hereinstated and also provides a dish from which a dog or other animal may take a drink while exercising.

A further object of the present Animal Exercising Apparatus is to provide a reasonably priced device for exercising a dog or other animal.

Even still an object of the present Animal Exercising Apparatus is to provide a durable, yet lightweight treadmill for exercising a dog or other animal.

Yet still another object of the present apparatus is to provide an animal exercising device which will accommodate various types and sizes of dogs and other animals.

An additional object of the present apparatus is to provide an animal exercising device which allows a user to pre-set an amount of time such user wishes to exercise an animal.

FIELD OF THE INVENTION

The present invention relates to an Animal Exercising Apparatus comprising a treadmill apparatus and a detachable cage. Said treadmill apparatus has a hollow parallelepiped platform with an interior base and a dish platform having a dish, and a conveyor pulley system located within said interior base. Said conveyor pulley system comprises a continuous conveyor belt disposed over, around and in direct contact with first rollers and a second roller rotatably attached to opposite ends of said interior base, and a motor assembly for rotating said first rollers, thereby causing said conveyor belt to rotate around said first and second rollers.

SUMMARY OF THE INVENTION

In view of the aforestated known types of exercising devices for dogs and other animals now present in the prior art, the general purpose of the present Animal Exercising Apparatus, described subsequently in greater detail, is to provide an Animal Exercising Apparatus which has many novel features that result in an Animal Exercising Apparatus which is not anticipated, rendered obvious, suggested, or even implied by prior art, either alone or in combination thereof.

To accomplish this, such Animal Exercising Apparatus generally comprises a treadmill which may be used to exercise a dog or other animal. Such treadmill may be produced in various sizes to accommodate various types and sizes of dogs or other animals. Said treadmill further comprises a frame produced from metal and plastic or other suitable materials, a detachable cage to ensure that a dog or other animals stays on the treadmill, a conveyor belt resting on a series of rollers and ball bearings, which is powered by means of a chain drive and an electric motor and is operated on standard household current. Said treadmill also comprises a starting pedal and an electric timer. Said treadmill is equipped with a water dish, as well. To use the Animal Exercising Apparatus, the animal owner simply places a dog or other animal on said treadmill and anchors said cage in place. Such animal owner then sets a timer for an amount of time and starts the treadmill by pressing the starting pedal. The dog or other animal is coaxed into running on the conveyor belt, thus allowing it to obtain exercise without having to go outdoors.

Thus has been broadly outlined the more important features of the present Animal Exercising Apparatus so that the detailed description thereof that follows may be better understood and in order that the present contribution to the art may be better appreciated.

Numerous objects, features and advantages of the Animal Exercising Apparatus will be readily apparent to those of ordinary skill in the art upon reading the following detailed description of presently preferred, but nonetheless illustrative, examples of the present Animal Exercising Apparatus when taken in conjunction with the accompanying drawings. In this respect, before explaining the current examples of the present Animal Exercising Apparatus in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the Animal Exercising Apparatus. It is therefore important that the claims be regarded as including such equivalent constructions insofar as they do not depart from the spirit and scope of the present invention.

Objects of the present Animal Exercising Apparatus, along with various novel features that characterize the invention are particularly pointed out in the claims forming a part of this disclosure. For better understanding of the Animal Exercising Apparatus, its operating advantages and specific objects attained by its uses, refer to the accompanying drawings and description.

BRIEF DESCRIPTION OF THE DRAWINGS

Figures

REFERENCE NUMERALS

10—Animal Exercising Apparatus
15—treadmill
17—power cord
19—latch
20—platform
21—side wall
22—interior base
23—front wall
24—rear wall
25—dish platform
26—conveyor pulley system
27—conveyor belt
29—first rollers
30—second roller
32—switch
33—timer
34—dish
40—cage
41—bar
43—interior
45—door
47—hinge
50—lower frame bar
51—frame rear
62—first axle
64—motor assembly
65—arm
66—second axle
80—animal

DETAILED DESCRIPTION OF THE DRAWINGS

With reference now to the drawings, and in particular FIGS. 1 through 4 thereof, an Animal Exercising Apparatus employing the principles and concepts of the present invention and generally designated by the reference number 10 will be described.

Figure 1:
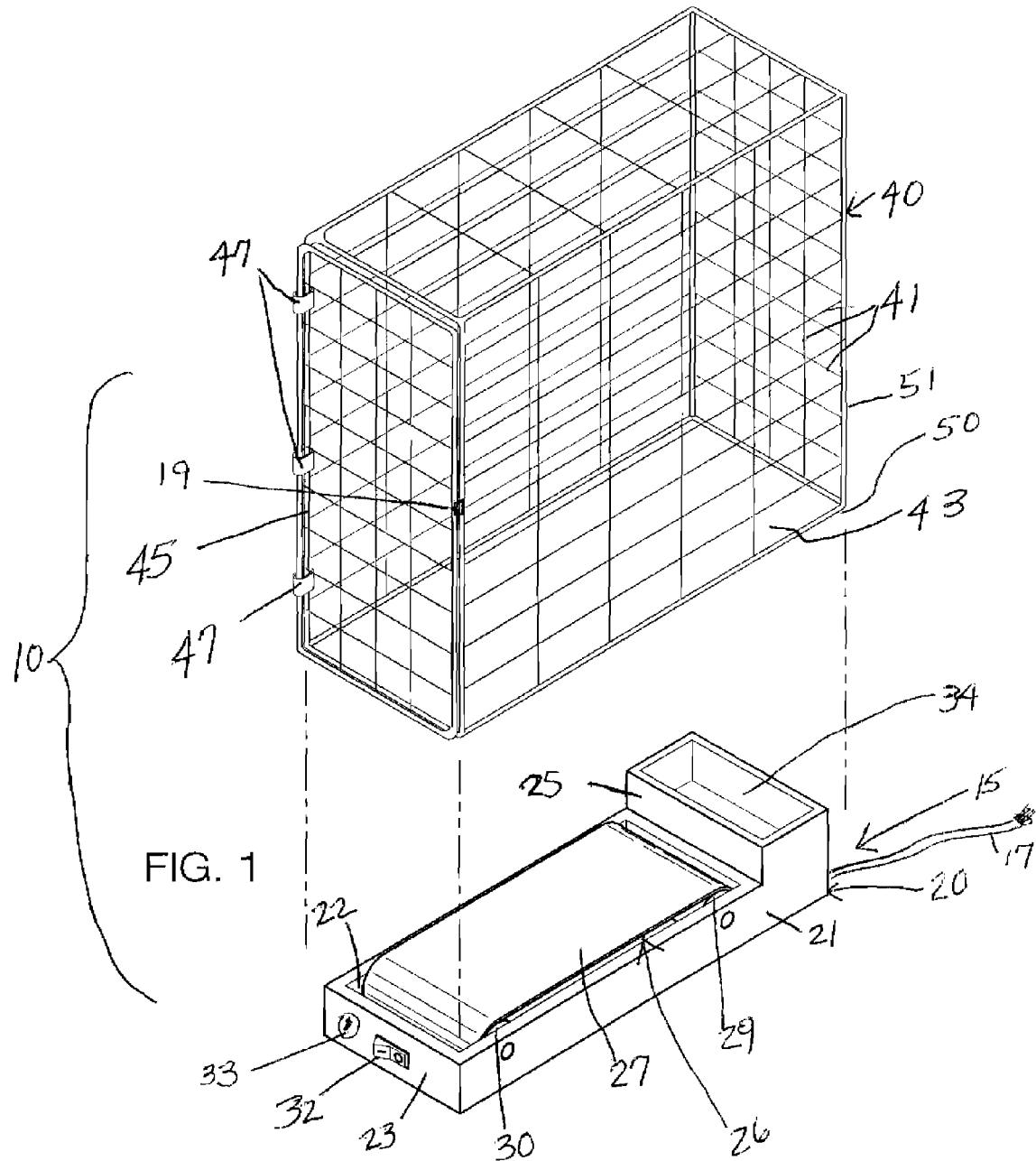
FIG. 1 is a perspective view of an Animal Exercising Apparatus 10 illustrating a treadmill apparatus with a cage in a lifted position directly above said treadmill, said cage having a door in closed position.

Referring to FIG. 1, shown therein is an Animal Exercising Apparatus 10 illustrating a treadmill 15 with a cage 40 in a lifted position directly above said treadmill 15, said cage 20 having a door 45 in closed position. The present Animal Exercising Apparatus 10 discloses a treadmill 15 for use in exercising a dog or other animal 80. The present Animal Exercising Apparatus 10 comprises a treadmill 15 and a cage 40 which is removably disposed over to surround said treadmill 15. Said treadmill 15 comprises a parallelepiped platform 20 having two side walls 21, a front wall 23, a rear wall 24 (shown in FIG. 4), and has a hollow interior base 22. Said treadmill 15 may be manufactured to accommodate various sizes of animal. Thus, for example, said treadmill 15 may be manufactured in small, medium, and large sizes. Said platform 20 is formed of lightweight and durable materials, such as high molecular weight polyethelyne plastic material, or other materials a person skilled in the art would use to manufacture a treadmill at a reasonable price. A raised dish 34 is incorporated into a dish platform 25 which is structurally incorporated into said platform 20 at the rear wall 24 end of said platform 20. Within said interior base 22 resides a conveyor pulley system 26, shown in more detail in FIG. 3. Said conveyor pulley system 26 comprises first rollers 29 and a second roller 30. Said first rollers 29 are rotatably attached to the side walls 21 on a first axle 62 at the dish platform 25 end of said interior base 22. Said second roller 30 is rotatably attached to said side walls 21 on a second axle 66 at the opposite end from said first rollers 29. A continuous conveyor belt 27 is disposed over and in direct contact with and around the first rollers 29 and a second roller 30. Said conveyor belt 27 is formed of durable, non-slip, textured rubber or other suitable materials. Said conveyor belt 27 may be manually started or stopped by pressing a switch 32 to on or off position, respectively. An electronic timer 33 is located adjacent to said switch 32. Said timer 33 may be set for a user-determined amount of time for exercising said animal and shuts off the treadmill when such time expires. Said treadmill 15 has a power means such as electricity via a power cord 17.

FIG. 1 also illustrates a cage 40. Said cage being formed of metal and plastic or other suitable materials a person skilled in the art would use to manufacture a durable, reasonably-priced cage, which would prevent escape of an animal 80, such as a dog, while using the present Animal Exercising Apparatus 10. Said cage 40 is formed of bars 41 running longitudinally and latitudinally forming matrices such that a 4-sided cage 40 frame is formed. Said cage is sized so as to be capable of being placed over said treadmill 15. Said cage 40 has a door 45 which is attached to said cage 40 via hinges 47 on one side of said door 45. Said cage 40 has a lower frame bar 50 continuously running along the lower edge of said cage 40. Said cage 40 further has a hollow interior 43 to accommodate placement of an animal 80, such as a dog, inside said cage 40. As illustrated in FIG. 1, said cage 40 is removably disposed over said treadmill 15 so that said door 45 is located at a front wall 23 end of said platform 20.

Figure 2:
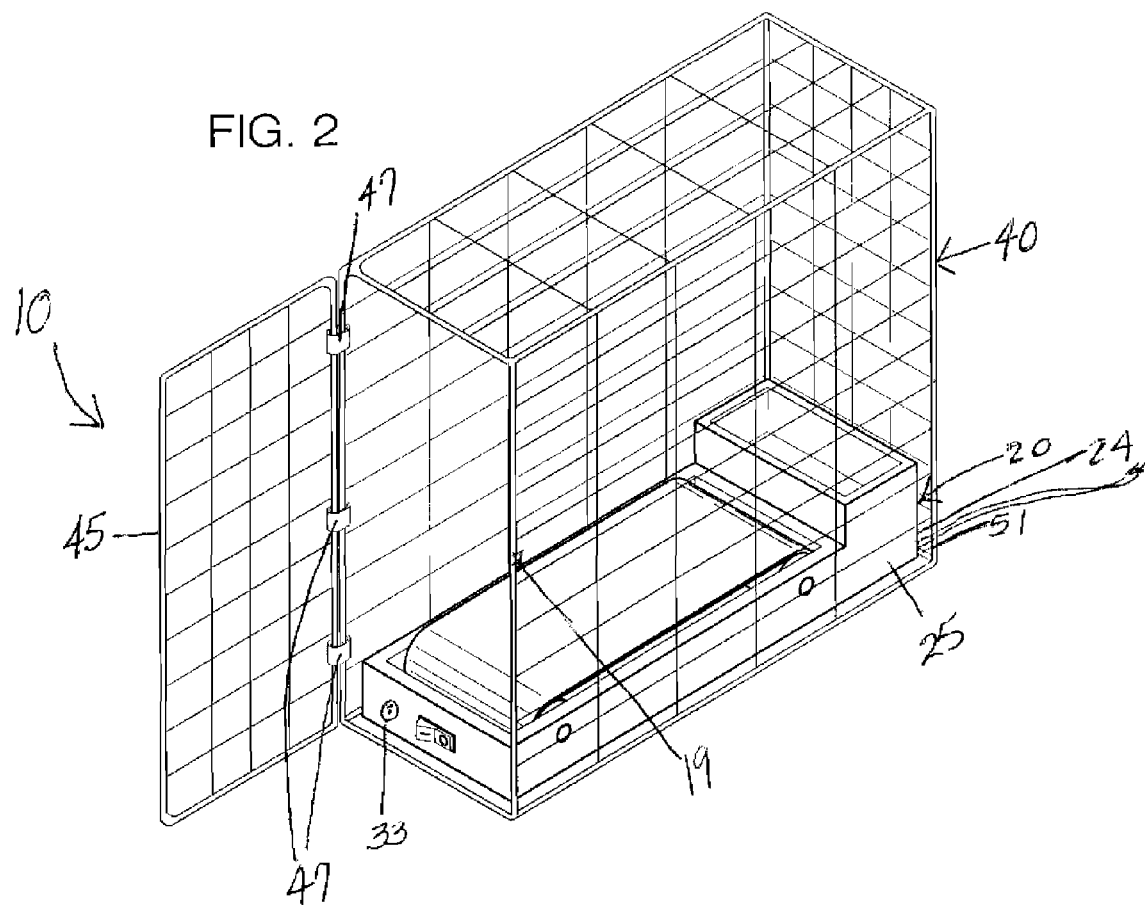
FIG. 2 is a perspective view of an Animal Exercising Apparatus illustrating a cage having a door in an open position, such cage being seated on a treadmill treadmill apparatus.

FIG. 2 is a perspective view of an Animal Exercising Apparatus 10 illustrating a cage 40 having a door 45 in an open position. Hinges 47 are located on only one side of said door 45 so as to hold door onto cage 40. A latch 19 on said door 45 prevents a dog or other animal 80 from escaping. FIG. 2 illustrates cage 40 in a positioned over and surrounding a treadmill 15, with a rear wall 24 of a dish platform 25 located at the frame rear 51.

Figure 3:
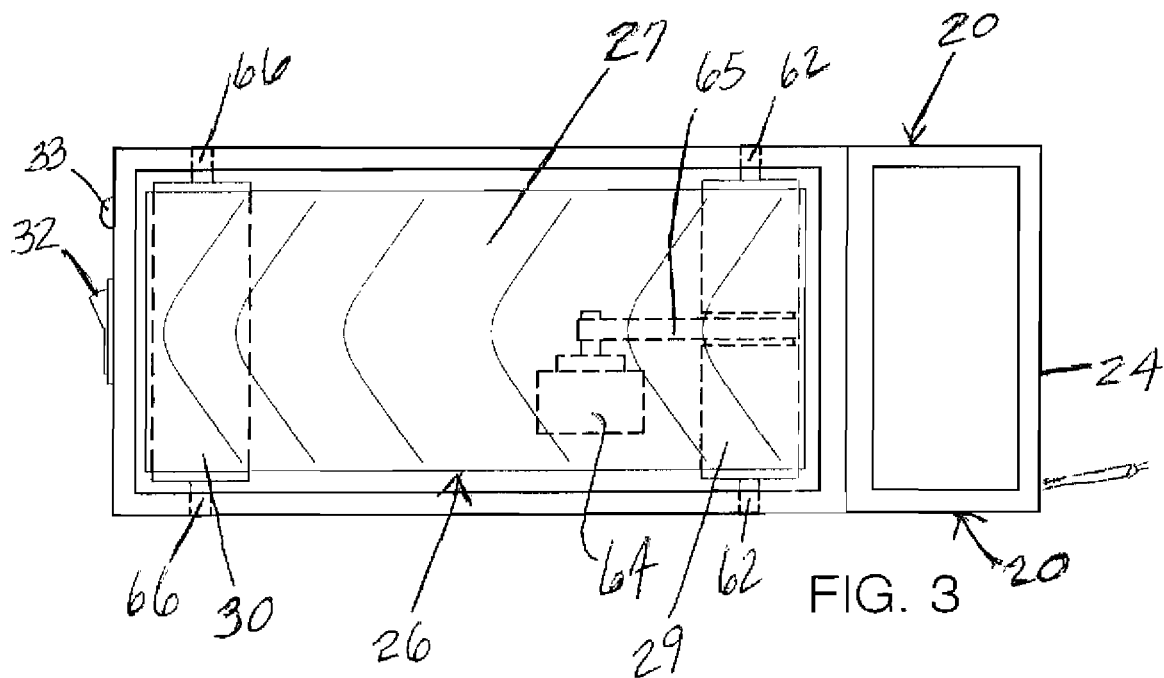
FIG. 3 is a top cross-sectional view of an Animal Exercising Apparatus a conveyor pulley system and a motor in broken lines.

FIG. 3 is a top cross-sectional view of an Animal Exercising Apparatus 10 illustrating a conveyor pulley system 26 disposed within an interior base 22 of said platform 20. Said conveyor pulley system 26 comprises first rollers 29 and a second roller 30 having ball bearings. Said first rollers 29 have an arm 65 of a motor assembly 64 disposed between them, while said first rollers 29 are rotatably attached to the side walls 21 on a first axle 62 at the dish platform 25 end of said interior base 22. Said second roller 30 is rotatably attached to said side walls 21 on a second axle 66 at the opposite end from said first rollers 29. A continuous conveyor belt 27 is disposed over and in direct contact with and around the first rollers 29 and a second roller 30. Said conveyor belt 27 is started or stopped by pressing a switch 32 to on or off position, respectively. A motor assembly 64 disposed within said interior base 22 between said first rollers 29 and said second rollers 30 and underneath said conveyor belt 27 provides for rotating the first rollers 29, thereby causing said conveyor belt 27 to move around said first rollers 29 and second roller 30. Said motor assembly 64 is operated on standard household current, is powered by means of a chain drive and electric motor, and further, is started and stopped via a switch 32 located on the front wall 23 (shown in FIG. 1) of said platform 20, along with a timer 33, located adjacent to said switch 32, for setting an amount of time for operation.

Figure 4:
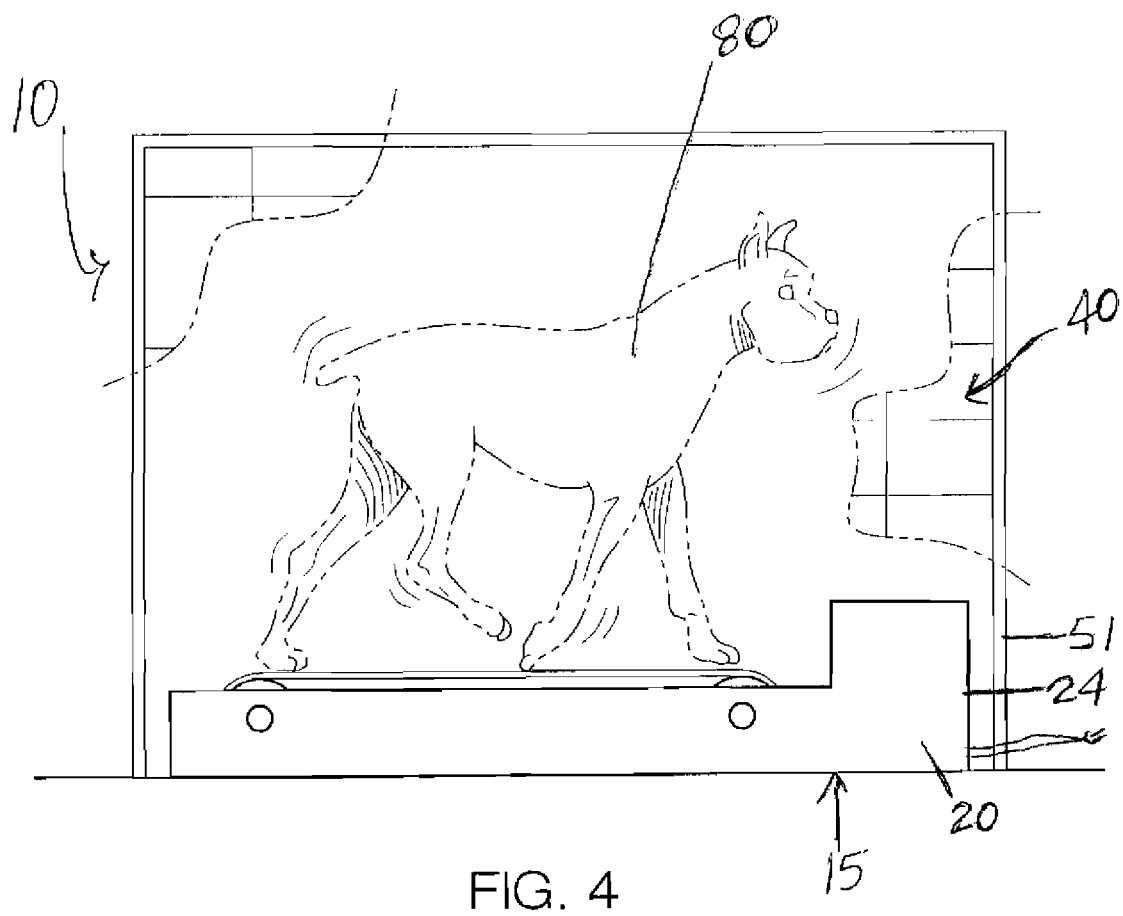
FIG. 4 is a cut-away side elevation view of illustrative use of an Animal Exercising Apparatus by a dog, shown in broken lines. The broken lines shown in FIG. 4 are for illustrative purposes only and form no part of the claims.

FIG. 4 is a cut-away side elevation view of illustrative use of an Animal Exercising Apparatus 10 by a dog 80. A cage 40 is removably placed over and surrounding a treadmill 15 with the rear wall 24 of said platform 20 facing the frame rear 51 of said cage 40. Said Animal Exercising Apparatus 10 may be used by an animal 80, such as a dog, to provide said animal with indoor exercise during winter months, for example, or to provide indoor exercise opportunities for an animal living in confined quarters, such as a high-rise apartment.

Operation:

Use of the present Animal Exercising Apparatus begins by placing a treadmill 15 on a surface, such as a floor, and placing a cage 45 over and surrounding said treadmill 15. An owner of an animal 80, such as a dog, continues use by opening a door 45 of said cage 45 and placing said animal 80 onto said treadmill 15 with the face of said animal 80 facing said dish 34. Use continues by setting a timer for a user-specified amount of time the owner wishes to exercise such animal 80 and pressing a switch 32 to an on-position. Use of said Animal Exercising Apparatus 8 may be terminated by timer-controlled stopping of operation of said treadmill 15 or by pressing said switch 32 to an off-position.

With respect to the above description then, it is to be realized that the optimum dimensional relationships for the parts of the Animal Exercising Apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the present Animal Exercising Apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An animal exercising apparatus comprising:
   a treadmill, said treadmill further comprising
      a parallelepiped platform having two side walls, a front wall, a rear wall and a hollow interior base;
      a raised dish platform incorporated within said platform at a rear wall end of said platform
      a dish removably disposed within said platform;
      a conveyor pulley system disposed within said interior base further comprising:
         a pair of first rollers rotatably attached to side walls at one end of said interior base;
         a second roller rotatably attached to the opposite end of said interior base;
         a motor assembly disposed within said interior base between said first rollers and said second roller and underneath a continuous conveyor belt, said motor assembly being electrically powered;
         a continuous conveyor belt disposed between, over and in direct contact with said first roller and second roller for supporting said conveyor belt, said first rollers being rotatable by said motor assembly and thereby causing said conveyor belt to move around said first rollers and second roller;
a switch for controlling said motor assembly; and
a timer for controlling said motor assembly;
a four-sided cage removably disposed over and around said treadmill;
a door on one side of the cage; and
a latch on the door.

2. The animal exercising apparatus of claim 1 wherein said conveyor belt is formed of durable, non-slip, and textured rubber.

3. An animal exercising apparatus comprising:
a treadmill, said treadmill further comprising
a parallelepiped platform having two side walls, a front wall, a rear wall and a hollow interior base; and
a conveyor pulley system disposed within said interior base further comprising:
a pair of first rollers rotatably attached to side walls at one end of said interior base;
a second roller rotatably attached to the opposite end of said interior base;
a motor assembly disposed within said interior base between said first rollers and said second roller and underneath a continuous conveyor belt, said motor assembly being electrically powered;
a continuous conveyor belt disposed between, over and in direct contact with said first roller and second roller for supporting said conveyor belt, said first rollers being rotatable by said motor assembly and thereby causing said conveyor belt to move around said first rollers and second roller; and
a switch for controlling said motor assembly; and
a four-sided cage removably disposed over and around said treadmill;
a door on one side of the cage; and
a latch on the door.

4. A method of using an animal exercising apparatus comprising:
utilizing an animal exercising apparatus comprising:
a treadmill, said treadmill further comprising
a parallelepiped platform having two side walls, a front wall, a rear wall and a hollow interior base;
a raised dish platform incorporated within said platform at a rear wall end of said platform
a dish removably disposed within said platform;
a conveyor pulley system disposed within said interior base further comprising:
a pair of first rollers rotatable attached to side walls at one end of said interior base;
a second roller rotatable attached to the opposite end of said interior base;
a motor assembly disposed within said interior base between said first rollers and said second roller and underneath a continuous conveyor belt, said motor assembly being electrically powered;
a continuous conveyor belt disposed between, over and in direct contact with said first roller and second roller for supporting said conveyor belt, said first rollers being rotatable by said motor assembly and thereby causing said conveyor belt to move around said first rollers and second roller;
a switch for controlling said motor assembly; and
a timer for controlling said motor assembly;
a four-sided cage removably disposed over and around said treadmill;
a door on one side of the cage; and
a latch on the door;
removably placing said treadmill on a surface, such as a floor;
removably disposing said cage over and around said treadmill;
opening said door of said cage;
facing said animal toward said dish platform;
placing said animal onto said treadmill;
setting the timer for a user-specified amount of time to exercise said animal; pressing a switch to an on-position; and
selectively terminating use by timer stopping of operation of said treadmill; and
selectively terminating use by pressing said switch to an off-position.

* * * * *